United States Patent [19]

Van Gheluwe et al.

[11] 3,770,455
[45] Nov. 6, 1973

[54] PRODUCTION OF CARBONATED BEVERAGES

[75] Inventors: Joris E. A. Van Gheluwe; Miroslav Dadic, both of Montreal, Quebec, Canada

[73] Assignee: Molson Industries Limited, Toronto A.M.F., Ontario, Canada

[22] Filed: Mar. 31, 1971

[21] Appl. No.: 129,790

[52] U.S. Cl............... 426/477, 99/79, 23/2 R, 23/150
[51] Int. Cl............... C12g 1/06, C12g 3/00
[58] Field of Search............ 99/49, 79; 23/2 R, 23/150; 62/70

[56] References Cited
UNITED STATES PATENTS

| | | | |
|---|---|---|---|
| 2,693,446 | 11/1954 | Krevelen | 23/2 R |
| 2,421,568 | 6/1947 | Kurland | 23/2 R |
| 1,968,899 | 8/1934 | Nathan | 23/150 |

OTHER PUBLICATIONS

Clerck, J. De., A Textbook of Brewing, Vol. one, Chapman & Hall Ltd., London, 1957 (Pp. 426, 427, 432–435).

Klopper, W. J., On Foam Properties of Beer, Wallerstein Laboratories Communications, Vol. XVIII No. 61, 1955, (pp. 123–133).

*Primary Examiner*—David M. Naff
*Attorney*—Thomas M. Marshall

[57] ABSTRACT

Carbonated fermented alcoholic beverages of increased stability are produced by carbonating with carbon dioxide which has been subjected to a deoxygenating agent to remove traces of oxygen, and which has a purity of at least 99.98 percent.

5 Claims, 1 Drawing Figure

PATENTED NOV 6 1973
3,770,455
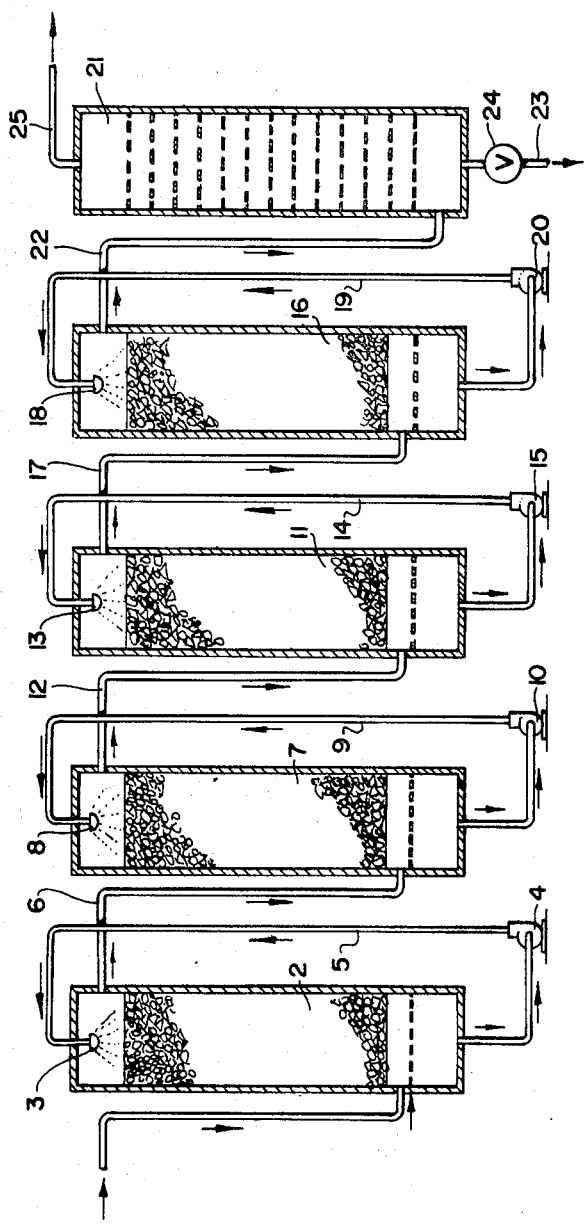

PRODUCTION OF CARBONATED BEVERAGES

The present invention relates to the production of carbonated beverages. In particular, the present invention relates to the production of carbonated beverages particularly malt beverages and preferably beer of improved stability including inter alia increased shelf life and flavour stability.

In the brewing of beer, it is normal to treat the beer with carbon dioxide inter alia on storage, carbonation and washing of the beer (dusting) to provide a beer which is acceptable to the consumer and is for example a sparkling beer with a good head and pleasant taste. The carbon dioxide used in the processing of the beer is normally obtained from fermentation gas produced during the fermentation stage in the brewing of the beer or may be obtained from other industrial sources. The normal procedure used in the purification of the carbon dioxide particularly from the fermentation gas consists of scrubbing the gas in order to eliminate extraneous material followed by active carbon treatment, compression, cooling and liquefying The liquefied gas is stored in liquid form until needed and is vaporized by heat prior to its use for carbonation of the beer. The purity of the carbon dioxide gas is usually measured and expressed as 99.9 percent pure or better. The last traces of the uncondensible gases which amount to less than 0.1 percent and usually in the range 0.05 percent to 0.02 percent of the carbon dioxide gas and in particular consist mainly of oxygen, nitrogen and argon, have heretofore not been measurable accurately with commonly used equipment such as the 100 millilitre burette technique according to Zahm & Nagel and thus breweries have not heretofore considered the very low oxygen content of the carbon dioxide gas to have any significant effect whatsoever on the stability of beer. The carbon dioxide gas has thus heretofore been used directly from the vaporization of the liquefied carbon dioxide in the treatment of the beer and contains the traces of the above non-carbon dioxide gases.

It has now been surprisingly found that the traces of the noncarbon dioxide gases in the carbon dioxide gas have a substantial detrimental effect on the stability of the beer, and in particular substantially reduce the shelf life of the beer and the flavour stability of the beer.

In particular, it is necessary to consider the overall effect of the total oxygen that is passed through the beer in storage, particularly during continuous storage. More specifically it is found that there is a substantial cumulative effect of oxygen on the oxidation susceptible beer components, e.g. the polyphenols and humulones, in the storage of beer and for example at a flow rate of 0.5 cubic feet of carbon dioxide per 1,200 barrels of beer, the carbon dioxide containing approximately 0.5 millilitres of air per litre, more than 1 ml. of pure oxygen would pass through every litre of beer on a seven-day storage. Such a concentration of oxygen flowing through the beer adversely affects the taste of the beer particularly after a prolonged shelf life of bottled beer and the colloidal stability of the beer is also substantially affected producing hazes in the beer. Thus it is believed that the reason for the harmful effects of the passage of carbon dioxide containing traces of oxygen through the beer during storage is that the beer constituents actually act as oxygen scavengers, i.e., they continuously react with the oxygen. Further, it has been found, as will be shown hereinafter, that the non-carbon dioxide gas contained in the carbon dioxide is not air but is a mixture of inter alia oxygen, argon and nitrogen in which the oxygen content is substantially in excess of that contained in normal air. Thus up to half the non-carbon dioxide gas contained in the carbon dioxide is oxygen.

The present invention provides a method of treatment of the carbon dioxide whereby to substantially lower the oxygen content of the carbon dioxide and thus improve the stability of the beer treated with the carbon dioxide including shelf life and flavour retention.

According to the present invention therefore there is provided in the production of a carbonated beverage which comprises passing carbon dioxide containing traces of oxygen therein through said beverage, the improvement which comprises subjecting said carbon dioxide prior to passage through said beverage with a deoxygenating agent to remove traces of oxygen therefrom whereby to improve the stability of the carbonated beverage so obtained.

While the present invention is primarily concerned with the treatment of malt beverages and in particular beer it will be readily realized that the present invention is applicable to the treatment of any carbonated beverage containing compounds highly susceptible to oxidation by molecular oxygen such as orange and lemon juice which contain terpenes and the like and which have heretofore been treated with carbon dioxide containing traces of oxygen.

The deoxygenating agent must be one which does not adversely affect the carbon dioxide and further which does not introduce unpalatable or toxic gases into the carbon dioxide. For example, alkaline solutions of pyrogallol or sodium dithionite are not useful as deoxygenation agents due to the solubility of carbon dioxide in alkali. Further neutral and acidic solutions of sodium dithionite evolve toxic malodorous hydrogen sulfide and ammoniacal solutions of cuprous chloride evolve ammonia vapour and are also not useful.

A particularly useful deoxygenation agent (oxygen scavenger) is a 2M chromous chloride solution in dilute hydrochloric acid. The oxygen absorbing capacity of such a solution is about 150 percent of its volume, absorbing over 99 percent of the oxygen on the first pass. Such a chromous chloride solution does not dissolve carbon dioxide. The evolution of hydrogen in acidic media (1) is negligible and the rate of oxygen pick-up is extremely satisfactory.

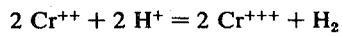

$$2\ Cr^{++} + 2\ H^+ = 2\ Cr^{+++} + H_2 \qquad (1)$$

The reagent acts almost stoichiometrically according to the equation (2).

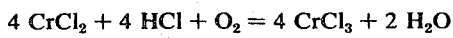

$$4\ CrCl_2 + 4\ HCl + O_2 = 4\ CrCl_3 + 2\ H_2O$$

Other oxygen scavengers include the following:

A cuprous chloride solution containing ammonium chloride prepared according to Bayer (F. Bayer, Brenstoff Chem., 34, 109, 1953) and was prepared as follows: 250 g. of cuprous chloride and 530 g. of ammonium chloride were dissolved in 1.5 l. of water and stored over copper straps. This solution does not evolve either acid or ammonia vapour.

A further oxygen scavenger is a 10 percent solution of pyrogallol in 10 percent aqueous sulfuric acid.

The present invention will be further illustrated by way of the accompanying drawing which is an apparatus for use in the deoxygenation of carbon dioxide according to a preferred embodiment of the present invention.

Referring to the accompanying drawing, carbon dioxide containing traces of non-carbon dioxide gases pass from the liquefied source of carbon dioxide (not shown) through line 1 to the bottom of a first deoxygenation tower 2 where it passes in counter current flow to an acidic chromous chloride solution from spray head 3, the aqueous acid, i.e., solution being recirculated to the spray head 3 via pump 4 and line 5. From the top of the tower 2 the carbon dioxide gas passes through line 6 to the bottom of a second deoxygenation tower 7 where it is contacted in counter current flow with an acidic chromous chloride solution from spray head 8, the solution being recirculated through line 9 via pump 10. From the top of the tower 7 the deoxygenated carbon dioxide is passed to the bottom of a wash tower 11 via line 12 where it passes in countercurrent flow to boiled water (deoxygenated water) from spray head 13 recirculating through line 14 via pump 15. From the top of the tower 11 the washed carbon dioxide is passed through a second wash tower 16 via line 17 where it passes countercurrent to boiled water from spray head 18 which water is recirculated through line 19 via pump 20. From the top of the tower 16 the washed and deoxygenated carbon dioxide is passed through a demister tower 21 via line 22 where the moisture contained therein is removed and exits from the bottom of the tower through line 23 and valve 24. The dried deoxygenated carbon dioxide exits from the tower 21 via line 25 and then passes through an oxygen detector, (a solution of a redox indicator) (not shown) which indicates the presence of oxygen in the carbon dioxide and subsequently passes to the vessels (not shown) containing the beer or other beverage to be treated with the deoxygenated carbon dioxide. A flow meter (not shown) is placed in the line 1 before the first deoxygenation tower 2 to measure the flow rate of the carbon dioxide. The towers 2, 7, 11 and 16 are conventional liquid gas contact towers containing Raschig rings and the like to effect mixing the gas and liquids. The redox indicator is placed in its container in the path of the deoxygenated carbon dioxide only after the whole apparatus is bled with carbon dioxide gas for a number of hours to purge it of any air present. A suitable indicator for detecting oxygen is the disodium salt of 5,5'-indigosulphonic acid in its leuco form. Thus the blue indicator is placed in the container of the apparatus and decolorized by adding a small amount of sodium dithionite. If the indicator turns blue it is an indication that the system is not completely purged of air. The capacity of the chromous chloride solution as an oxygen scavenger was determined for different batches and different concentrations by measuring the volume of carbon dioxide passed through the system until the time when the redox indicator turned blue. Coloration of the indicator indicates that the particular batch of oxygen scavenger is exhausted and should be replaced with a fresh batch. Extensive experiments run with the chromous chloride solution establish that it can be used very economically on a plant production scale. Due to its high efficiency (only slightly below a stoichiometrical yield of 22.4 liters of oxygen per 488 grams of chromous chloride) and the relatively low oxygen content of the industrial carbon dioxide, the chromous chloride oxygen scavenger may be used on a large scale economically and without regeneration. Further even less concentrated chromous chloride solutions set forth heretofore have extremely favourable oxygen scavenger effects.

The present invention will be illustrated by way of the following Example.

EXAMPLE

A quantitative determination of the oxygen and caustic insoluble gases contained in industrial carbon dioxide were carried out using standard and modified Zahm & Nagel equipment as well as the gas chromatographic technique as set forth by A. Jamieson, E. C-H Chen., J.E.A. Van Gheluwe, in the Proceedings A.M. A.S B.C., 106, 1968 and the results obtained are shown in Table I.

TABLE I

Gas Analysis

| | Normal | Deoxygenated $CO_2$ |
|---|---|---|
| Total non-$CO_2$ gas in ml. for 2 Lit. $CO_2$ gas | 0.6 to 0.9 | 0.4 |
| Purity of the $CO_2$ in % | 99.97 to 99.96 | 99.98 |
| % of oxygen in non-$CO_2$ gas | 47.0 to 35.4 | 0.6 |
| % of argon in non-$CO_2$ gas | 2.5 to 1.95 | 2.15 |
| % of nitrogen in non-$CO_2$ gas | 50.5 to 62.65 | 97.25 |
| Volume of oxygen in ml. per Litre of $CO_2$ gas | 2.8 to .32 | 0.0024 |

It will be seen from Table I that the carbon dioxide treated in accordance with the present invention, i.e., the deoxygenated carbon dioxide is for all practical purposes free of oxygen whereas the normal carbon dioxide which has heretofore been used in the treatment of beer contains amounts of oxygen and further the percentage of oxygen in the non-carbon dioxide gas is substantially higher than that in normal air. Thus it will be seen that large quantities of oxygen are present in the 0.1 percent of non-carbon dioxide gas present in the carbon dioxide. Furthermore oxygen uptake by beer is particularly rapid in the first hours of contact with the air as will be seen from a paper presented at the Master Brewers Association of America, October, 1969 and published in Technical Quarterly, July issue 1970. Washing the beer with carbon dioxide containing oxygen is detrimental because the oxygen reacts fairly fast within the early hours of contact and even at low temperatures, 32 – 40° F. there is a remarkable quantity of oxygen uptake by the beer. Carbonation of beer with carbon dioxide containing oxygen is also detrimental to the beer. The results as will be seen from Table II are lesser physical stability, lesser flavour stability and coarser foam bubbles.

TABLE II

| | Chill Stability in Formazin Turbidity Units | Forcing Test in Formazin Turbidity Units |
|---|---|---|
| Control beer only carbonated with plant $CO_2$ | 51 | 190 |
| Beer washed with fermentation $CO_2$ at rate of 1L. gas per hr. for 24 hrs. | 60 | 208 |
| Beer washed with deoxygenated fermentation $CO_2$ at rate of 1L. gas per hr. for 24 hrs. | 39 | 73 |

The stability tests of Table II were carried out on bottled beer. The chill stability as well as the forcing tests are expressed in Formazin Turbidity units as described in the Analytical Proceedings of the American Society of Brewing Chemists, 1957 edition. These tests are well known in the industry and indicate the shelf life of the beer and in particular the lower figure in Table II the greater the shelf life, the chill stability test and the forcing test constituting efforts of determining the ageability of the beer and constituting accelerated aging.

In addition to the increased shelf life the beer treated with the deoxygenated carbon dioxide in accordance with the present invention showed a remarkable flavour stability as compared to the beer treated with regular carbon dioxide containing the non-carbon dioxide gases as determined by a taste panel and the foam appearance of the beer was also very much improved by using deoxygenated carbon dioxide in accordance with the present invention.

We claim:

1. In the method of carbonating a fermented alcholic beverage wherein carbon dioxide containing non-carbon dioxide gases is passed through said beverage the improvement comprising purifying said carbon dioxide by subjecting the carbon dioxide, prior to its passage through said beverage, to a deoxygenating agent selected from the group consisting of chromic chloride in hydrochloric acid, pyrogallol in dilute sulphuric acid and cuprous chloride in aqueous ammonium chloride to remove traces of oxygen to produce carbon dioxide of at least 99.98 percent purity which contains an oxygen content of 0.6 percent or less of the non-carbon dioxide gases present therein whereby an improved stability of the carbonated fermented alcholic beverage is obtained.

2. A process as claimed in claim 1 in which the fermented alcholic beverage is a malt beverage.

3. A process as claimed in claim 1 in which the fermented alcholic beverage is beer.

4. A process as claimed in claim 3 in which the carbon dioxide is obtained from the vaporization of liquid carbon dioxide.

5. A process as claimed in claim 4 in which the liquefied carbon dioxide is obtained by liquefying gaseous carbon dioxide obtained from the fermentation process in the production of beer.

* * * * *